UNITED STATES PATENT OFFICE.

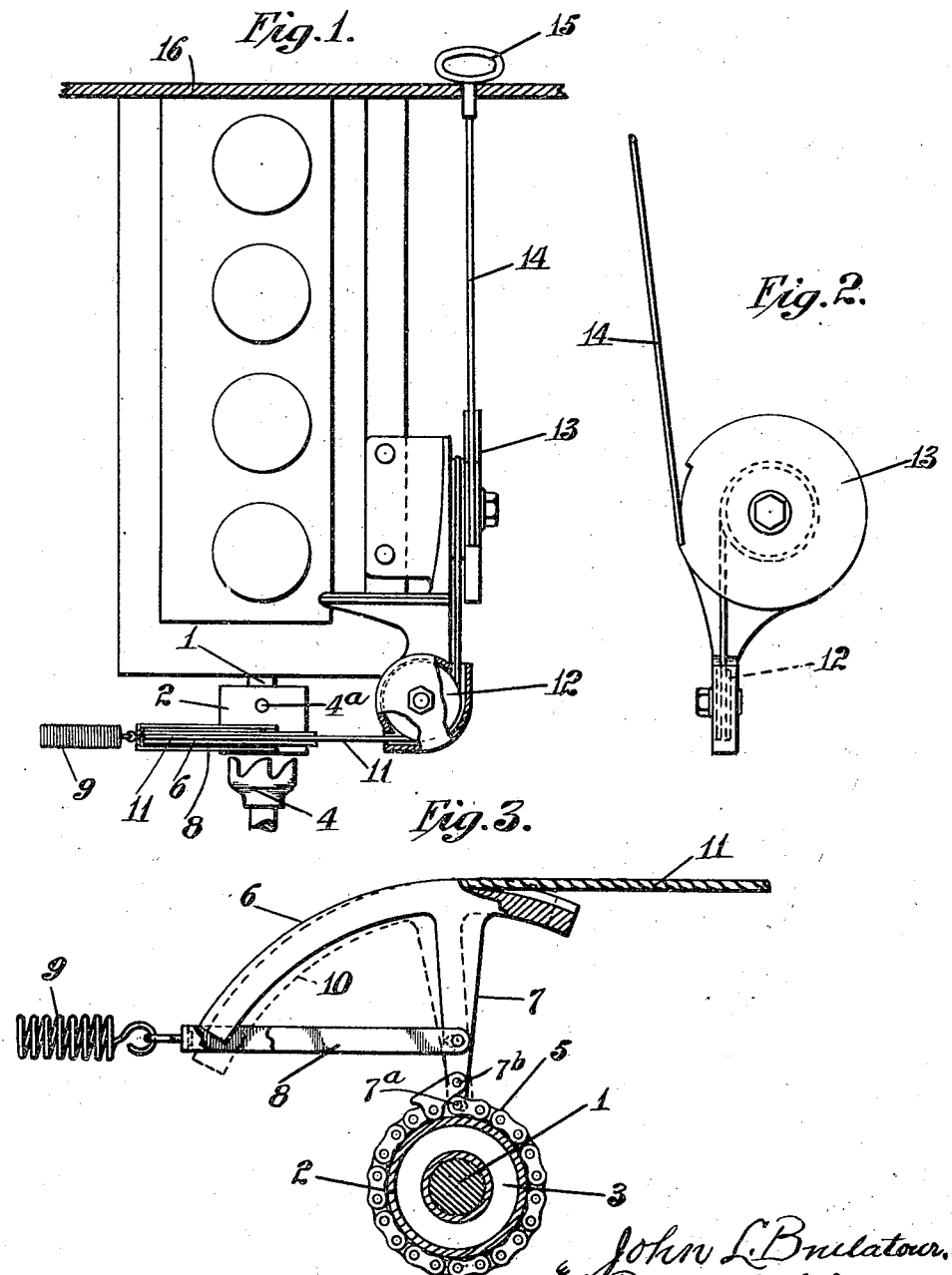

JOHN LEONARD BRULATOUR AND BENJAMIN LÉVAL DARROW, OF NEW YORK, N. Y., ASSIGNORS TO JOHN C. FORSTER, OF NEW YORK, N. Y.

STARTER FOR GAS-ENGINES.

1,250,134.  Specification of Letters Patent.  Patented Dec. 18, 1917.

Application filed May 29, 1917. Serial No. 171,627.

*To all whom it may concern:*

Be it known that we, JOHN L. BRULATOUR and BENJAMIN L. DARROW, citizens of the United States, and respectively residing at the borough of Manhattan, city and county of New York, have jointly invented a new and useful Improved Starter for Gas-Engines, of which the following is a specification.

Our invention relates more particularly to a starter for gas engines on motor vehicles, by which the engine may be started without dismounting from the vehicle.

By our device we engage the engine shaft with a friction clutch to impart the necessary volute impulse thereto, and we use a flexible clutch member, employing for that purpose a chain of the type known to the trade as a sprocket chain, such as ordinarily used for a chain gear and which we have found to be especially adapted for the purpose.

We thus are enabled to secure an equal distribution of the frictional pressure at all points of contact of the chain with the surface of the shaft, also freedom from frictional resistance when it is disengaged and freedom from any engagement on back firing, as a reverse motion of the shaft effects the automatic release of the chain from engagement.

We thus provide an extremely simple, effective and inexpensive device which may be readily attached to almost any type of motor driven vehicle.

Having thus generally described some features of our invention we will now more particularly describe the same by reference to the annexed drawing in which similar reference characters indicate identical parts.

Figure 1, is a plan view of applicants device showing the same mounted on a vehicle and the manual control.

Fig. 2, is a detail showing the cable connections between the handle and the clutch.

Fig. 3, is a detail showing the clutch mechanism.

In the drawing Fig. 3, the clutch is shown as operatively engaged.

In the drawing 1, is the driving shaft shown in cross section. 2, is a hub secured to the shaft by the pin 4ª, and in which is the recess 3, to receive the crank clutch 4, which is supplied as an auxiliary in the event of the disablement of the frictional clutch mechanism. 5, is the movable clutch member which is a flexible chain, a chain consisting of rigid links comprised of flat plates which are pivotally connected near their ends with each other and with the links of the next section; the pivotal joints having great flexibility and the inner edges of the links which operatively bear upon the enlarged section of the shaft 1 formed by the hub 2, are preferably formed with a contour having a complementary curve to that of the hub with which they engage, thus providing a multiplicity of rigid sections united by flexible joints adapted to provide a multiplicity of bearing points, which upon engagement with the engine shaft shall exert a uniform compressive stress thereon at all points of contact therewith. The terminal link of such chain pivoted at 7ᵇ to the arm 7 is constructed, as shown, so that the chain, when engaged, grips substantially the entire circumference of the hub. This chain is shown in Fig. 3, as engaged with the shaft, but which is normally disengaged, the shaft running free within the loop made by it. 6, is an eccentric, segmental pulley, carried by the concentric lever arm 7, which is fulcrumed on the elastically supported yoke 8, such elastic support being provided by the tension spring 9, which not only furnishes a floating pivotal support, but functions to restore the pulley to normal position and to disengage the clutch when the manual control is released. The arm 7, may thus receive a compound motion the forward motion of the pulley primarily being on its pivotal center provided by the tension of the spring 9, and after thereby effecting the engagement of the clutch 4 with the shaft 1, the further advance of the pulley is on its radial or true center, which is identical with that of shaft 1. This engagement is effected as follows: The ends of the chain, or clutch member 4, are secured to the arm 7, at the different radial points 7ª, and 7ᵇ, and when the pulley is first given a forward movement the immediate effect is to shorten the loop of the chain by the differential in the motions at the two points, at which the ends of the chain are secured to the lever arm 7, thus engaging the clutch. The cable 11, is secured to the pulley 6, and thence passes over the pivotal pulley 12, to the double pulley 13; to this pulley the cord 14, is secured, connected at its outer end with the handle 15.

The frame 16, is a diagrammatic view of a section of a motor car to show the position of the control 15, to the chauffeur's seat; being cut through back of the dashboard 16.

The operation of the device is as follows:

When the cord 14, is drawn toward the chauffeur, the pulley 6, receives a forward volute motion, causing the arm 7 to primarily pivot on the fulcrum 8 until the engagement of the clutch, which advances the point 7a, on the lever arm 7, a greater distance than the point 7b, but in a reverse direction to the motion of the outer end of the lever arm 7 as indicated by the dotted lines in Fig. 3, shortening the loop of the clutch and engaging it with the shaft 1. By reason of the extreme flexibility of the pivotal joints, the engagement is instantaneous. The further motion of the pulley 6, is upon its true center which is the center of the shaft 1, and consequently the shaft 1, revolves as a unit with the pulley 6. When the handle 15, is released the tension spring 9, which has been extended by the forward motion of the pulley 6, by its retraction to its neutral position, brings the pulley back to its normal position. The reverse motion of the pulley, consequent on the release of the tension of the cable 11, permits it to again fulcrum on the yoke 8, releasing the clutch. In the event of the engine back firing the same result ensues, the retrograde motion of the pulley in either event producing a like effect.

As there is no stop, or position bearing point required to release the clutch it is obvious that such engagement and release of the clutch may occur at such point in the cycle as shall be most convenient.

Having thus specified, shown and described the same, we claim as novel and our joint invention:

1. In a starter for gas engines having a driving shaft, a flexible clutch member encircling said shaft, a lever connected at different points with the ends of said clutch member and a yielding member pivoted to said lever, for initially fulcruming said lever on its forward movement to cause said clutch member to engage said shaft, said yielding member acting to return said lever to starting position and to simultaneously cause said clutch member to become disengaged from said shaft.

2. In a starter for gas engines having a driving shaft, a flexible clutch member encircling said shaft, comprising a chain having rigid links, pivotally connected to provide a multiplicity of bearing points, a lever connected at different points with the ends of said clutch member and a yielding member pivoted to said lever, for initially fulcruming said lever on its forward movement to cause said clutch member to engage said shaft, said yielding member acting to return said lever to starting position and to simultaneously cause said clutch member to become disengaged from said shaft.

3. In a starter for gas engines having a driving shaft, a flexible clutch member encircling said shaft, comprising a series of pivotally connected rigid links, the inner edges of which have a contour conforming to the periphery of the shaft and are adapted to bear thereon, a lever connected at different points with the ends of said clutch member and a yielding member pivoted to said lever, for initially fulcruming said lever on its forward movement to cause said clutch member to engage said shaft, said yielding member acting to return said lever to starting position and to simultaneously cause said clutch member to become disengaged from said shaft.

JOHN LEONARD BRULATOUR.
BENJAMIN LÉVAL DARROW.